July 8, 1958  J. W. JAMIESON ET AL  2,841,996

ACTUATING MECHANISM FOR ADJUSTABLE VEHICLE SEAT

Filed Nov. 20, 1953  2 Sheets-Sheet 1

J. W. JAMIESON
T. C. DINGMAN
INVENTORS

BY

ATTORNEYS

July 8, 1958   J. W. JAMIESON ET AL   2,841,996
ACTUATING MECHANISM FOR ADJUSTABLE VEHICLE SEAT
Filed Nov. 20, 1953   2 Sheets-Sheet 2
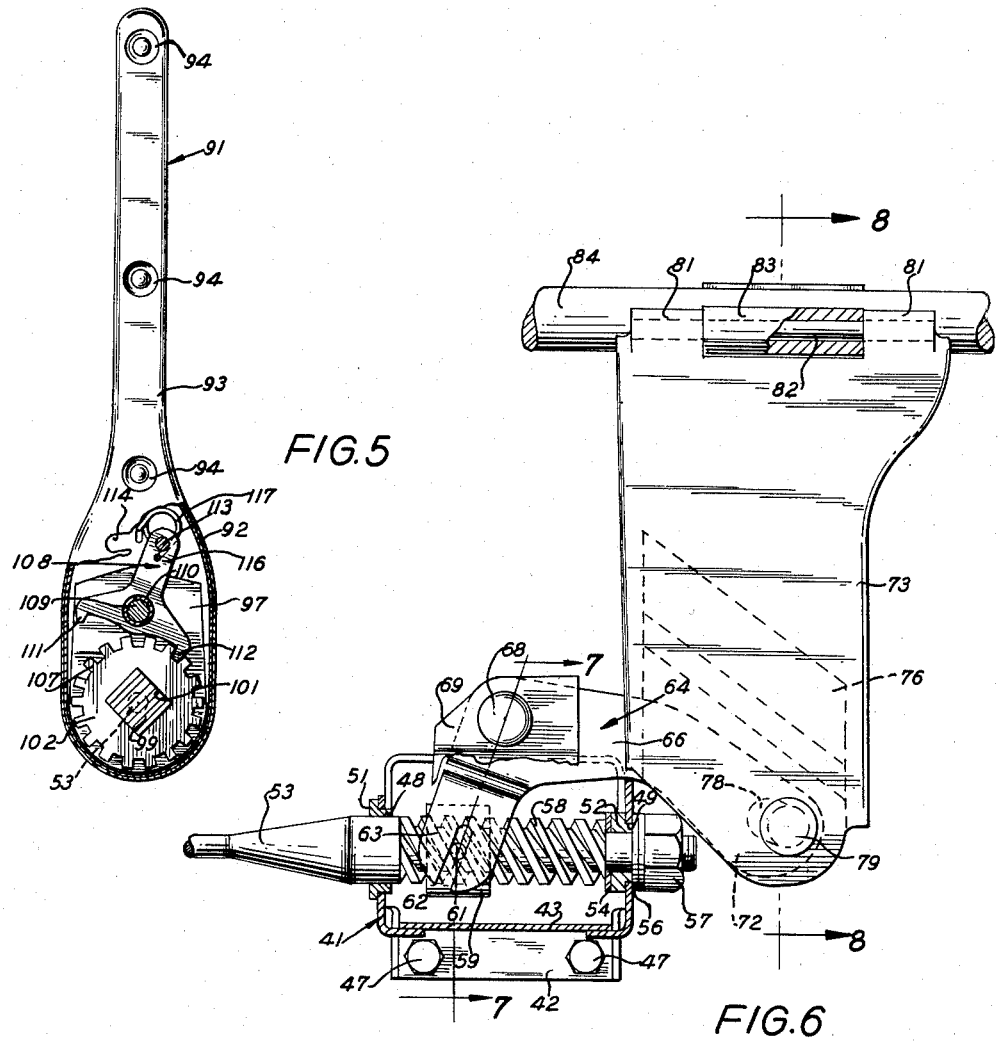
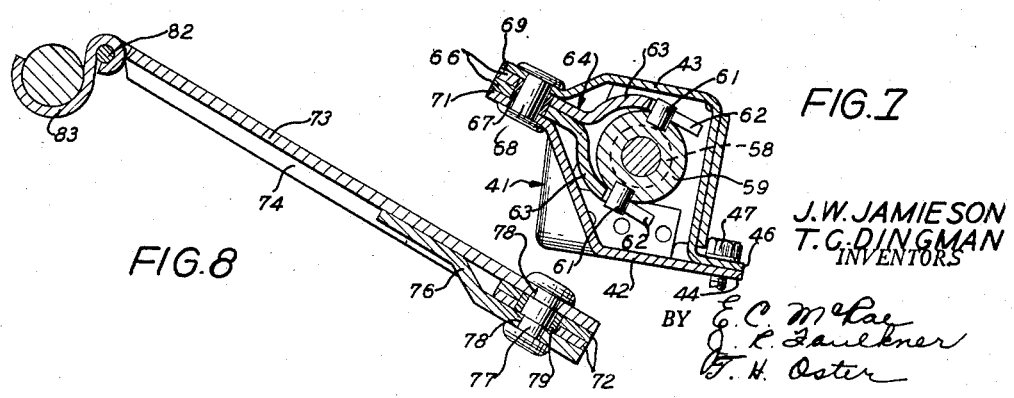
J. W. JAMIESON
T. C. DINGMAN
INVENTORS
ATTORNEYS

United States Patent Office 2,841,996
Patented July 8, 1958

2,841,996

ACTUATING MECHANISM FOR ADJUSTABLE VEHICLE SEAT

John W. Jamieson and Thomas C. Dingman, Dearborn, Mich., assignors to Ford Motor Company, Dearborn, Mich., a corporation of Delaware Application November 20, 1953, Serial No. 393,259

1 Claim. (Cl. 74—89)

This invention relates generally to adjustable seats for motor vehicles, and has particular reference to vehicle seats adapted to be adjusted vertically as well as horizontally.

An object of this invention is to provide improved actuating mechanism for adjusting a motor vehicle seat upward and downward in a vertical direction. While the actuating mechanism can be used in connection with a seat which is to be adjusted vertically only, it is adapted for use in connection with the recently popular "four-way" seat in which the seat is adjustable in a vertical direction as well as in the conventional longitudinal direction. The mechanism finds particular application in connection with a "four-way" seat of the type shown in Patent Number 2,789,622, in which the longitudinally adjustable seat tracks at opposite sides of the seat are bodily supported and adjustable in a vertical direction either upwardly or downwardly by vertical lift mechanism.

A further object of the present invention is to provide an adjustable vehicle seat incorporating manually operable actuating mechanism for vertically adjusting the seat arranged in such manner as to effect simultaneous adjustment of each side of the seat and to selectively raise or lower the seat as desired.

Other objects and advantages of this invention will be made more apparent as this description proceeds, particularly when considered in connection with the accompanying drawings, wherein:

Figure 5 is an end elevation of the handle construction shown in Figure 4, partly broken away and in section.

Figure 6 is an enlarged plan view, partly broken away and in section, of a portion of Figure 1 illustrating part of the actuating mechanism.

Figure 7 is a cross-sectional view taken on the line 7—7 of Figure 6.

Figure 8 is a cross-sectional view taken on the line 8—8 of Figure 6.

Figure 1:
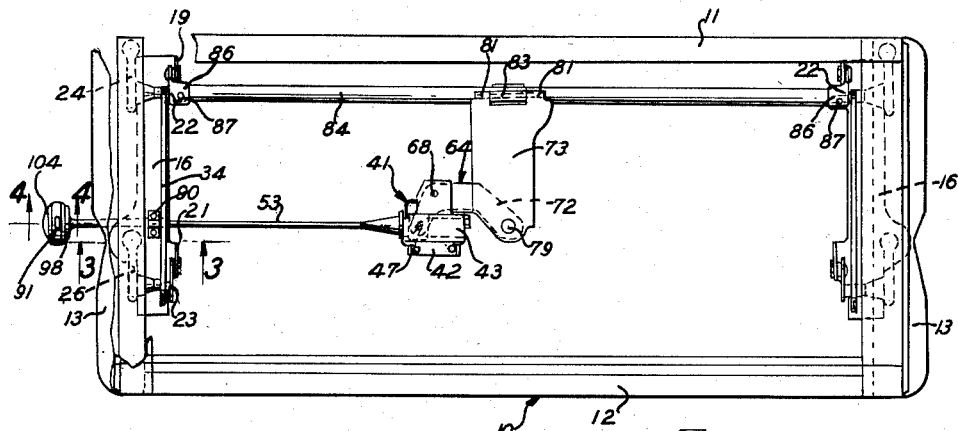
Figure 1 is a plan view of a "four-way" adjustable seat mechanism incorporating the present invention.
Figure 2:
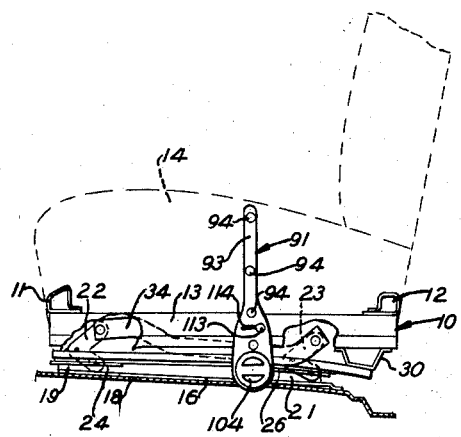
Figure 2 is an end elevation, partly broken away, of the construction shown in Figure 1.
Figure 3:
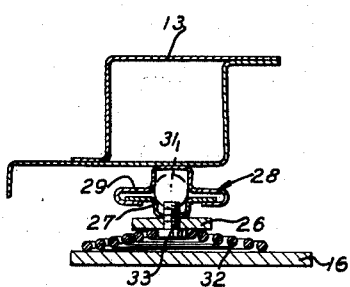
Figure 3 is an enlarged cross-sectional view taken on the line 3—3 of Figure 1.
Figure 4:
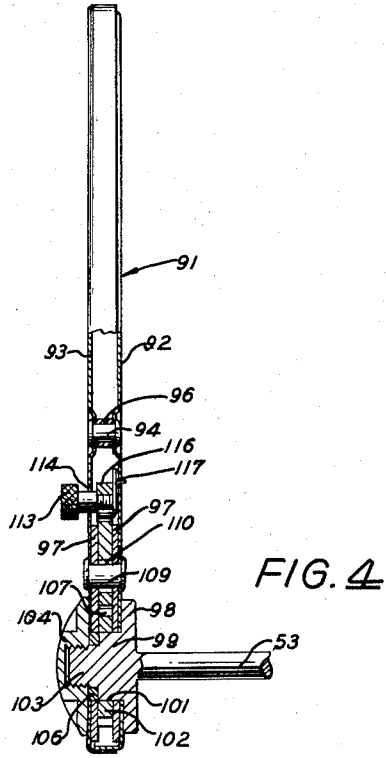
Figure 4 is an enlarged vertical cross-sectional view taken on the line 4—4 of Figure 1, through the manually operable handle.

Referring now to the drawings, and particularly to Figures 1 and 2, the seat frame 10 is formed of front and rear rails 11 and 12 respectively and side rails 13. As seen in Figure 2, the front and rear rails 11 and 12 are of box section and are seated upon the end rails 13, being suitably secured thereto as by welding. As shown in Figure 3, the side rails 13 are also the box section. The seat frame supports a conventional front seat 14 shown in phantom in Figure 2.

A pair of stamped floor brackets 16 are secured to the vehicle floor panel 18 at opposite sides of the seat. Each floor bracket has upwardly projecting front and rear flanges 19 and 21 serving as supports for bell crank levers 22 and 23 pivotally mounted thereon.

The lower arms of the bell crank levers 22 and 23 carry track support arms 24 and 26 respectively which are pivotally connected thereto, and which, as best seen in Figure 3, are connected to the lower track 27 of a longitudinal adjustable track unit 28. The upper track 29 of the track unit is secured to and supports the adjacent side seat frame rail 13. At its forward end the side frame rail 13 is directly seated upon the upper track 29 while at its rearward end a U-shaped bracket 30 is utilized between the frame rail and the track to accommodate the curvature of the track unit.

Antifriction balls 31 are assembled between the upper and lower tracks 29 and 27 respectively of each longitudinally adjustable track unit 28 to provide antifriction sliding movement between the track sections to facilitate longitudinal adjustment of the seat. The balls 31 are retained in the track unit between the studs 33 which serve to secure the track support arms 24 and 26 to the lower track 27, the ends of the studs 33 projecting into the track unit in the path of the antifriction balls 31.

The front and rear bell crank levers 22 and 23 at each side of the seat are interconnected by a longitudinally extending link 34 to insure their simultaneous operation.

The weight of the seat is counterbalanced by means of a coil spring 32 having its lower convolution resting upon the floor bracket 16 and its upper convolution retained in place by the head of the stud 33 and the adjacent track support arm 26. A coil spring 32 is provided beneath the track unit at each side of the seat frame to at least partially counterbalance the weight of the seat and the passengers and to thereby tend to equalize the effort required in raising and lowering the seat.

The foregoing construction is somewhat more fully described in the aforesaid Patent Number 2,789,622 of Dingman and Cook and reference is consequently made thereto. It will be apparent that the longitudinally adjustable track units 28 at each side of the seat are supported upon the track support arms 24 and 26 for bodily vertical movement. This vertical adjustment of the track units and the seat frame and seat is in the present instance effected by rotation of the front bell crank levers 22. Inasmuch as the rear bell crank levers are interconnected with the front bell crank levers by means of the longitudinally extending links 34, it will be seen that rotation of the front bell crank levers 22 effects a coordinated rotation of the rear bell crank levers 23 so that the front and rear portion of each side of the seat are simultaneously adjusted.

Inasmuch as the longitudinally adjustable seat track units 28 are bodily raised or lowered by the vertical lift mechanism, the lift mechanism and the actuating means therefor can be operated independently of the longitudinal adjustment of the seat. Consequently, the actuating mechanism may be permanently mounted in a fixed position upon the vehicle floor.

Referring now to Figures 1, 6, 7 and 8, the reference character 41 indicates generally the actuator housing assembly comprising a lower housing section 42 and upper housing section 43. The two housing sections are formed with juxtaposed marginal flanges 44 and 46 secured to each other and to the floor panel 18 of the vehicle by means of bolts 47.

The housing sections 42 and 43 form an enclosed box-like housing formed with aligned apertures 48 and 49 in opposite ends thereof receiving bushings 51 and 52 respectively. The inner end of an actuating shaft 53 is journaled in the bushings 51 and 52 carried by the housing 41. Axial movement of the actuating shaft 53 is prevented by thrust washers 54 and 56 on opposite sides of the bushing 52. The thrust washer 54 seats against a shoulder upon the shaft 53 while the thrust washer 56 is held in position by means of a nut 57 threaded upon the extreme end of the actuating shaft 53.

The portion of the actuating shaft 53 within the housing 41 is formed with square threads 58 engaged by a correspondently threaded nut 59. The nut 59 is cylindrical in cross-section and is provided with a pair of oppositely projecting pins 61 pressed or welded in place at diametrically opposite sides of the nut.

The pins 61 projecting from the nut 59 are slidably received within slots 62 formed in the bifurcated arms 63 of a bell crank assembly 64. The bell crank 64 is formed of a pair of bell crank arms 66 secured together and identical in shape except that the bifurcated arms 63 thereof are flared outwardly in opposite directions to embrace the cylindrical nut 59. The arms 66 of the bell crank assembly are provided with aligned apertures receiving a spacer 67 and a rivet 68. The rivet 68 extends through the arms 66 of the bell crank assembly 64 and through the outwardly projecting marginal flanges 69 and 71 of the upper and lower housing sections 42 and 43 respectively to secure the latter together and to also form a pivot for the bell crank assembly 64.

The spaced marginal flanges 69 and 71 of the housing sections thus not only form a support and guide for the bell crank assembly 64 but also form an opening through which the actuating arms 72 of the bell crank assembly extend for engagement exteriorly of the housing 41 with means connecting the bell crank lever to the vertical lift mechanism of the seat.

As best seen in Figures 6 and 8, the adjacent actuating arms 72 of the bell crank assembly 64 are pivotally connected to an actuating plate 73. The plate 73 comprises a flat stamping having turned over side flanges 74 for longitudinal rigidity, and reinforced adjacent one end by means of a reinforcing plate 76 secured to the plate 73 by welding. As best seen in Figure 8, the reinforcing plate 76 is bent downwardly adjacent the end of the plate 73 to provide a space therebetween for the reception of the actuating arms 72 of the bell crank lever assembly. A rivet 77 extends through aligned slots 78 in the actuating plate 73 and reinforcing plate 76 and also through a bushing or spacer 79 carried by the actuating arms 72 of the bell crank lever assembly.

The opposite end of the actuating plate 73 is formed with spaced eyes 81 receiving a hinge pin 82 pivotally connecting the plate 73 to a hinge bracket 83 welded to the cross shaft 84.

As best seen in Figure 1, the cross shaft 84 extends transversely of the vehicle seat between the opposite sides thereof and has its opposite ends seated within cylindrical openings formed in bosses 86 provided at the ends of the upper arms of the front bell crank levers 22. The cross shaft 84 is secured in the cylindrical sockets in the bosses 86 by means of pins 87 to prevent relative rotation therebetween.

It will be apparent from the foregoing that rotation of the actuating shaft 53 and the threaded portion 58 thereof effects an axial movement of the cylindrical nut 59 along the shaft. By reason of the pin and slot connection 61 and 62 between the cylindrical nut 59 and the bifurcated arms 63 of the bell crank lever assembly 64, the latter is rotated about its pivot pin 68. This rotation of the bell crank lever 64 effects a movement of the ends of the actuating arms 72 of the bell crank lever assembly in a direction longitudinally of the vehicle. This results in a movement longitudinally of the vehicle of the actuating plate 73, and since the latter is pivotally connected to the cross shaft 84 it will be seen that the cross shaft is likewise moved bodily in a direction longitudinally of the vehicle. This movement effects a rotation of the front bell crank levers 22 at opposite sides of the seat frame and by reason of the interconnecting links 34 a corresponding rotation of the rear bell crank levers 23. Since the lower arms of the front and rear bell crank levers 22 and 23 are connected by means of the track support arms 24 and 26 to the longitudinally adjustable track units 28, it will be clear that rotation of the actuating shaft 53 effects a vertical adjustment of the seat track units 28 and the seat frame carried thereby, the direction of movement vertically depending upon the direction of rotation of the actuating shaft 53.

Reference is now made to Figures 1, 2, 4 and 5 for an understanding of the manually operable means employed to selectively rotate the actuating shaft 53 to effect the desired vertical adjustment of the seat. The actuating shaft 53 extends transversely of the vehicle from the housing 41 and projects beyond the side frame rail 13 of the seat at the driver's side thereof. A bracket 90 on the floor bracket 16 supports the outer end of the shaft 53.

A manually operable handle 91 is formed with a sheet metal case having an inner channel shaped section 92 and an outer channel shaped section 93 embracing the inner section and secured thereto by means of rivets 94. The rivet heads are seated in recesses in the walls of the case and spacers 96 are provided to separate the sections 92 and 93 of the case. Adjacent the lower portions of the inner and outer sections 92 and 93 of the handle case the latter are widened and reinforced by means of reinforcing plates 97 welded to the inside of the handle sections.

The outer end of the actuating shaft 53 is provided with integral enlarged flange 98 abutting the inner handle section 92 and continuing into an intermediate shank portion 99 within the handle. The intermediate shank 99 of the actuating shaft 53 is provided with a square cross-section extending through a corresponding square opening 101 in a ratchet wheel 102. The ratchet wheel 102 is guided between the reinforcing plates 97 secured to the inner and outer sections of the handle.

The intermediate shank 99 of the actuating shaft 53 is formed with an integral end portion 103 smaller in cross-section and externally threaded to receive an end cap 104 abutting the outer handle section 93 and a spacer 106.

The teeth 107 of the ratchet wheel 102 are adapted to be engaged by a pawl 108 pivotally mounted upon a rivet 109 extending through the handle sections 92 and 93 and the reinforcing plates 97. A spacer 110 is provided encircling the rivet 109. The pawl 108 is formed with spaced projecting teeth 111 and 112 selectively engageable with the teeth 107 of the ratchet wheel 102 depending upon the position of the pawl 108. An actuating knurled knob 113 extends through a slot 114 in the outer handle section and is secured to the upper arm 116 of the pawl. It will be apparent that the pawl 108 can be readily adjusted by means of the knurled knob 113 between two alternate positions in which one or the other of the projecting teeth 111 and 112 engages the teeth 107 of the ratchet 102. An over-center spring 117 retains the pawl in the adjusted position.

It will be seen from the foregoing that rocking movement of the handle 91 by the driver of the vehicle is effective to rotate the actuating shaft 53 in one direction or the other depending upon the selected position of the pawl 108, and, as hereinbefore described, the rotation of the shaft 53 effects, through the threaded portion 58 of the shaft, the cylindrical nut 59, the bell crank lever assembly 64 and the actuating plate 73 a bodily movement of the cross shaft 84 in a direction longitudinally of the vehicle to rock the front and rear bell crank levers 22 and 23 about their respective pivots to raise or lower the vehicle seat as desired.

It will be understood that the invention is not to be limited to the exact construction shown and described, but that various changes and modifications may be made without departing from the spirit and scope of the invention, as defined in the appended claim.

What is claimed is:

Mechanism for actuating a cross shaft of a motor vehicle seat adjustable relative to the vehicle floor, comprising a pair of opposed stampings forming a box section housing, said stampings having juxtaposed marginal flanges adjacent the lower portion of said housing, fastening means securing said flanges together and to said vehicle floor, a pair of bearings in the opposite end walls of said housing, a transversely extending shaft extending through said housing and journaled in said bearings, said shaft having a portion extending laterally from said housing, a ratchet and pawl type handle mounted upon said last mentioned end of said actuating shaft to effect rotation thereof in either direction selected, a screw at the inner end of said actuating shaft within said housing, said housing sections having outwardly extending parallel marginal flanges at the opposite side of said housing from said first mentioned flanges, said last mentioned flanges being spaced apart to form a narrow slot therebetween opening into said housing, a bell crank lever having a pair of stamped sections lying adjacent each other throughout the major portion of their length and extending through the narrow slot between said last mentioned flanges of said housing sections and pivotally connected to said last mentioned flanges for pivotal movement about an axis extending at right angles to the axis of said actuating shaft, said lever sections being flared apart within said housing to embrace therebetween said actuating shaft, a traveling nut mounted upon said screw for lateral movement thereon as said actuating shaft is rotated, trunnions extending from opposite sides of said nut, the flared portions of said lever sections having slots formed therein for slidably receiving said trunnions, a connecting link one end of which is pivotally connected to the end of said bell crank lever remote from the flared end thereof for pivotal movement about a vertical axis and the other end of which is adapted to be pivotally connected to an intermediate portion of said shaft.

References Cited in the file of this patent

UNITED STATES PATENTS

| | | |
|---|---|---|
| 570,772 | Sampson | Nov. 3, 1896 |
| 968,303 | Winkler | Aug. 23, 1910 |
| 1,395,573 | Hughes | Nov. 1, 1921 |
| 1,952,376 | Knabusch et al. | Mar. 27, 1934 |
| 2,289,137 | Matter | July 7, 1942 |
| 2,641,305 | Oishei | June 9, 1953 |